3,140,191
LINSEED OIL EMULSION COMPOSITIONS COMPRISING DIPICOLINATE AND LINSEED OIL-DERIVED EMULSIFIERS
William L. Kubie, Peoria, Ill., assignor to the United States of America as represented by the Secretary of Agriculture
No Drawing. Filed Nov. 14, 1960, Ser. No. 69,239
10 Claims. (Cl. 106—254)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention pertains to the unobvious discovery that the addition of a very small proportion of 2,6-pyridine dicarboxylic acid (dipicolinic acid) in the form of a water-soluble salt such as the ammonium salt thereof, the salt being dissolved or dispersed in ethylene glycol or a similar polyhydroxy vehicle or coupling agent, to an oil-in-water emulsion paint composition containing an anti-fungal proportion of zinc oxide and metallic driers and totaling as much as 68 percent solids, or to a linseed oil-in-water varnish emulsion greatly reduces the amounts of conventional driers required, stabilizes the reduced proportion of conventional driers against rapid shelf-life loss of drying activity in the prepared formulation upon standing, and effectively stabilizes the emulsion towards the pigments and driers thus preventing inversion of the emulsion.

Despite certain marked disadvantages, latex (aqueous emulsion) paints have gained wide indoor use because of their ease of application as well as the ease with which they wash from the brush. However, latex paint emulsions are unstable to zinc oxide and to the desired large amounts of pigments ordinarily employed in oil based paints. Because of the necessary reduction in solids and pigment content the latex paints do not cover as effectively as oil-based paints. Furthermore, latex paints cannot be successfully applied to raw wood or to surfaces from which paint is chalking, and they require the substitution of mercurials for zinc oxide if anti-fungal activity is desired.

Despite the well-known limitations of the latex paints and the apparent advantages of a linseed oil-in-water emulsion paint, no oil-in-water emulsion paints are commercially available. This situation probably arises from the known fact that polyvalent metal ions such as those comprising metallic-driers favor water-in-oil emulsions rather than oil-in-water emulsions and that frequently the addition of the necessary driers to an oil-in-water system causes a delayed or even an immediate inversion to a completely useless water-in-oil emulsion. In attempts to reduce the inverting tendency of the metallic-driers on water-in-oil emulsion systems many chelating agents have been tried including ethylene diamine tetraacetic acid, sugar acids such as citric, fumaric, and itaconic acids, and amines such as $\beta,\beta$-dipyridyl and pyridine-carboxylic acid (picolinic acid). In all instances, however, there was either little or no emulsion-stabilizing effect or the metallic-drier itself appeared to have been chelated on standing and rendered incapable of promoting the drying of the coating composition vehicle. Although ortho-phenanthroline is superior to the above mentioned sequestrants in an oil-in-water emulsion paint and can be employed therein, it nevertheless also has disadvantages which apparently have prevented the appearance of commercially available linseed oil-water emulsion paints and varnishes that could compete with the latex emulsion paints. For example, ortho-phenanthroline is expensive and also must be used in much higher proportions than dipicolinic acid. Because of its very dark color and the relatively great proportion required, the ortho-phenanthroline solution darkens white and light-colored formulations to some extent and is objectionable on this basis.

A subordinate but by no means negligible aspect of my invention is the discovery that certain commercially unobtainable and apparently novel classes of "reactive" (drying) nonionic emulsifiers, which we prepared as representatively shown in Examples 1-9 by reacting the methyl esters of linseed fatty acids or the free linseed acids with sorbitol thus forming the sorbitol (or cyclized sorbitol) esters of linseed fatty acid as well as the corresponding polyoxyethylene adducts of the above sorbitol and cyclized sorbitol esters, the polyoxyethylene ethers of linseed alcohol prepared by ethenoxylating linseed alcohol, and also the linseed monoglyceride all have uniquely advantageous properties, especially when employed in our formulations. For example, pigmented and unpigmented films cast from aqueous solutions of these linseed oil-derived ethers and esters containing metallic driers lose water by evaporation, and concurrently the emulsifier molecules irreversibly polymerize by oxidative drying, thus losing their re-wettability and becoming relatively water-resistant film substance although it will be apparent that films of the ethenoxylated members are less resistant to water than the others, per se. The just-described property of the linseed polyoxyethylene ether and ester emulsifiers is responsible for unique advantages when these emulsifiers are employed in linseed oil-in-water paint or varnish emulsions comprising dipicolinic acid and sharply reduced amounts of conventional driers. Because of their specific compatibility with linseed oil, higher proportions of the linseed polyoxyethylene ester and ether emulsifiers can be used, and because they polymerize with other molecules of the same and with the free linseed oil of the emulsion to form polymers which actually are no longer emulsifier molecules but which actually form part of the film, they resist rewetting and improve the net drying time, probably partly because there is a larger (less diluted) proportion of functional groups in the film.

Although I prefer to employ the herein described linseed-derived hydrophilic and hydrophobic emulsifiers because they permit both a greatly improved emulsion stability and superior coatings, it should be understood that the addition of a dipicolinate and a coupling agent to an emulsion containing balanced conventional emulsifiers rather than linseed-derived emulsifiers also stabilizes such an emulsion although to a lesser degree than when the preferred emulsifiers are used, even though the dry film formed therefrom does not benefit from the presence of "fugitive" rather than permanent emulsifiers.

Accordingly, a primary object of my invention is the discovery of a more effective and less expensive substitute for ortho-phenanthroline and which, perhaps partly by virtue of a limited solubility and apparently favorable redox characteristics will form limited or non-inactivated chelates with conventional metallic driers such as cobalt, lead, or manganese naphthenates in a linseed oil-in-water emulsion paint or varnish coating composition while at the same time permitting a more stable emulsion therewith.

Another object of this invention is a less costly chelating agent which will not inhibit the drying action of metallic driers in a linseed oil-containing paint or varnish composition.

Still another object is a linseed oil-in-water emulsion paint or varnish composition comprising emulsifiers which are especially compatible with linseed oil and which have the property of polymerizing therewith so as to actually form a water-resistant film.

Yet another object is a linseed oil-in-water emulsion paint which may be readily diluted with water, which washes readily from the brush, and which when applied dries quickly so that it may be retouched without extended waiting and which is soon resistant to brief showers.

A still further object is a method of reducing the metallic drier requirement of a linseed oil-containing coating composition.

Other objects and advantages than those formally defined will be appreciated by one skilled in the art from the preceding discussion and from the specific examples which are set forth for purposes of precise instruction in the practice of the invention and not by way of limitation.

In the present invention dipicolinic acid is added preferably as the colorless ammoniacal 5 percent solution in ethylene glycol which essential component apparently serves as a coupling agent. Alternatively, an ammoniacal solution may be formed in situ from the dipicolinic acid by adding ammonium hydroxide until the pH of the oil-water emulsion reaches 8.0, and in this instance the necessary ethylene glycol should be added.

In model varnish type linseed oil emulsion systems designed for test purposes to be extremely sensitive, I found that as little as 0.2 percent of our linseed ether and ester emulsifiers in the presence of ammonium dipicolinate stabilized the emulsions in contrast to requirements of about 5 percent of conventional emulsifiers containing "built in" driers or about 10 percent if the standard emulsifiers were not bodied with driers. With these novel emulsifiers I have prepared stable high-solids content paints comprising about 0.03 percent of dipicolinate (about .1 percent based on the linseed oil content) along with only about 0.03 percent instead of the usual 0.06 percent of cobalt as the naphthenate (also based on the linseed oil) and omitting the usual lead naphthenate co-drier, with no lengthening of drying time and no shortening of shelf life. While ordinary circumstances would suggest benefiting via the savings on driers (especially on the expensive cobalt), it is clear that additional cobalt or other metallic driers may be added before use if an especially fast dry is required on a particular job.

It will also be apparent to one skilled in the art that the polyoxyethylated emulsifiers are hydrophilic and therefore should be added to the aqueous phase to "balance" a corresponding addition of hydrophobic non-polyoxyethylated (lyophilic) emulsifiers which are added to the disperse (oil) phase. It is also obvious that, depending upon the molar proportion of sorbitol reacted per mole of linseed fatty acids, predominantly the mono-, di-, tri-ester will be formed. Best results are obtained when the hydrophilic emulsifiers are those which have been ethenoxylated to the extent of between 13 and 20 oxyethylene moles, about 15 moles being preferred, and when the ratio of hydrophilic emulsifier to water is about 1:10 and that of the lyophilic emulsifier to the oil present is about 1:9.

Examples 1–9 show the preparation and certain inherent properties of the linseed oil-derived lyophilic and hydrophilic (ethenoxylated) classes of the herein employed emulsifiers.

EXAMPLE 1

*Linseed Oil Monoglyceride*

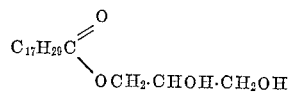

To 1,500 ml. pyridine in a 5000 ml. Morton flask provided with a stirrer, a gas dispersion tube, and a reflux condenser were added 500 g. linseed oil, 500 g. glycerol, and 5 g. sodium methoxide. The mixture was stirred and heated to reflux at 120° C. for 1 hour. Then the solution was cooled and washed three times with 1000 ml. portions of 15 percent HCl. Chloroform (2000 ml.) was added, and the resulting solution was washed three times with saturated NaCl solution. Then the product was dried over anhydrous $Na_2SO_4$ and stripped of chloroform in vacuo. Since analysis by the periodate oxidation method indicated 73 percent conversion to α-monoglyceride, two molecular distillations were employed to give a product containing 93 percent of the monoglyceride. Infrared analysis of the thusly obtained substantially pure product showed no absorption at 9.6μ charateristic of the diglycerides. On analysis of the white semisolid product showed no absorption at 9.6μ characteristic of 151, a saponification number of 155, and a saponification equivalent of 371 (theory 369.4).

EXAMPLE 2

*Sorbitol Esters of Linseed Fatty Acids*

To 900 ml. pyridine in a flask provided with a stirrer, thermometer, and a 12-inch fractionating column packed with Beryl saddles were added 180.4 g. (0.614 mole) of the mixed methyl esters of linseed fatty acids, 111.9 g. (0.64 mole) of sorbitol, and 1.8 g. (0.033 mole) of NaOMe. Complete solution of all reactants was obtained at 80° C. After 7¼ hrs. of reflux all the methanol had been removed. The reaction products were cooled and neutralized with acetic acid. The pyridine was removed under nitrogen in vacuo. The product was dissolved in chloroform and washed with 50 percent aqueous EtOH. The chloroform solution was dried and the chloroform removed by vacuum distillation. The product was a light brown semi-soft solid having an acid value of 10.2, a saponification value of 410, a saponification number of 137, and an iodine value of 138.3.

EXAMPLE 3

*Cyclized Sorbitol Monoester of Linseed Fatty Acids*

In a 500 ml. Morton flask provided with a stirrer, thermometer, nitrogen sparge, and distillation head and connected to a water aspirator through a receiver and solid carbon dioxide-acetone cold trap, were placed 112.5 g. (0.40 mole) of linseed fatty acids, 80.1 g. (0.44 mole) of sorbitol, and 0.2 g. of NaOH. The reactants were vigorously stirred and heated to 240° C. for 3½ hours, becoming homogeneous after 2½ hours. On cooling, the excess polyhydric alcohol separated to give a cloudy solution. The cloudy solution was added to chloroform and then cooled to 0° C. to precipitate the said excess alcohol. After filtering, the chloroform solution was neutralized, refiltered, and stripped of chloroform in vacuo. The product was a light yellow water-dispersible oil having an acid value of 1.58, an iodine value of 128, a saponification equivalent of 440, a saponification number of 127. UV analysis indicated the presence of 2.98 percent diene, 0.33 percent triene, and 0.01 percent tetraene.

EXAMPLE 4

*Ethenoxylation of Cyclized Sorbitol Monoester of Linseed Fatty Acids*

44.0 g. (0.1 mole) of the cyclized sorbitol monoester of Example 3 and 0.882 g. of NaOMe were placed in a 500 ml. Morton flask equipped with a stirrer, a gas dispersion tube, and an outlet tube, and a thermometer. Nitrogen was allowed to sweep through the flask, and the contents were heated to 110° C. After ½ hr. the nitrogen was cut off and ethylene oxide substituted. The temperature was raised to 130° C. and after 7 hrs. 26.2 g. of ethylene oxide was found to have reacted. The temperature was raised to 140–145° C. and maintained for 6 hrs. at the end of which time a total of 69 g. of ethylene oxide (15.7 moles per mole of the ester) had reacted. The product was dissolved in chloroform, and the catalyst was neutralized by adding a solution of HCl in chloroform. About 25 g. of activated carbon was added and the solution was filtered. The desired product freed of chloroform in vacuo using nitrogen ebulation was a light-orange colored, viscous, water-soluble material having an acid value of 0.7, a saponification equivalent of 1091, and a saponification number of 51.4. UV analysis showed that it contained 9.57 percent diene unsaturation and 2.90 percent of triene unsaturation.

EXAMPLE 5

*Linseed Fatty Acid Monoester of Sorbitol Polyoxyethylene Ether*

182.2 g. of sorbitol and 1 g. of KOH in a Morton flask provided with a stirrer, a gas dispersion tube, and an outlet tube were heated to 140° C. while being swept with nitrogen. Then the nitrogen was cut off and ethylene oxide introduced. The reaction was conducted at 140° C. with vigorous stirring and at essentially atmospheric pressure for 15 hours by which time 858 g. of ethylene oxide had reacted (19.5 moles EtO per mole sorbitol). The polyoxyethylene ether of sorbitol was a water-soluble dark red viscous material.

Then 208 g. (0.2 mole) of the above polyoxyethylene ether of sorbitol was mixed with 56.8 (0.2 mole) of linseed fatty acids and 100 ml. of toluene in a flask provided with a thermometer and a reflux condenser through a Dean Stark trap. After 90 hours of refluxing at 170° C., 3.8 ml. of water had collected. The ester was dissolved in 150 ml. benzene and stirred for 2 hours after adding 25 g. activated carbon. After filtering through a thin layer of diatomaceous earth and removal of the solvent under vacuum, 240 g. of a water-soluble, reddish colored, slightly viscous material was obtained. It had an acid value of 4.1, a saponification equivalent of 1207, a saponification number of 46.5, and an iodine value of 36.8.

EXAMPLE 6

*Linseed Fatty Acid Diester of Sorbitol Polyoxyethylene Ether*

208 g. (0.2 mole) of the sorbitol polyoxyethylene ether intermediate of Example 5 was mixed with 113.6 g. (0.4 mole) of linseed fatty acids and 120 ml. toluene in a flask provided with a thermometer and reflux condenser connected through a Dean Stark trap. After 10 hours of refluxing at 170° C., 7.6 ml. of water was collected. The diester was dissolved in 200 ml. benzene, and after adding 25 g. activated charcoal was stirred for 2 hours before filtering through a thin layer of diatomaceous earth. Upon removing the solvent under vacuum 300 g. of reddish water-soluble oil was obtained. It had an acid value of 3.0, a saponification equivalent of 731, a saponification number of 74.7, and an iodine value of 64.7.

EXAMPLE 7

*Linseed Fatty Acid Triester of Sorbitol Polyoxyethylene Ether*

520 g. (0.5 mole) of the sorbitol polyoxyethylene ether intermediate of Example 5 was mixed with 424 g. (1.5 moles) of linseed fatty acids and 250 ml. toluene in the flask of Example 6. Enough toluene was removed to bring the pot temperature to 170° C. After 50 hours of refluxing 27 ml. of water was collected. 895 g. of a reddish nonviscous material, easily dispersible in water, was obtained by treating as in Example 4. The product had an acid value of 1.7, a saponification equivalent of 591, a saponification number of 95, and an iodine value of 89.4.

EXAMPLE 8

*Mixed Glycerol (⅓ Mole) Cyclic Sorbitol (⅔ Mole) Monoesters of Linseed Fatty Acids*

147.5 g. (0.163 mole) of linseed oil and 60.7 g. (0.324 mole) sorbitol were mixed with 100 ml. xylene in a 500 ml. Morton flask provided with a stirrer, thermometer, nitrogen ebulator, and a reflux condenser attached through a Dean-Stark trap. The temperature was raised to 150° C. by removal of xylene and 1.08 g. of NaOMe was added. The temperature was then increased to 235° C. by constant removal of xylene. The reaction was continued for 5 hours at 235° C. with vigorous stirring under nitrogen, at which time the mixture became homogeneous. The solution was filtered hot through diatomaceous earth, and 197 g. of a clear, orange-colored, viscous, water-dispersible product was obtained. It had an acid value of 0.56, a saponification equivalent of 402, a saponification number of 139.5, and an iodine value of 136.

EXAMPLE 9

*Polyoxyethylene Ether of Linseed Alcohol*

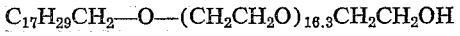

$C_{17}H_{29}CH_2-O-(CH_2CH_2O)_{16.3}CH_2CH_2OH$ 132.5 g. of conjugated linseed alcohol and 0.7 g. sodium hydroxide were placed in a 1000 ml. Morton flask provided with a stirrer, a gas dispersion tube, and an outlet tube. The reactants were heated to 190° C. while allowing nitrogen to sweep through. The nitrogen was cut off and ethylene oxide introduced. After 10 hours a total of 359 g. of ethylene oxide (16.3 moles per mole of linseed alcohol) had reacted. After neutralization and purification the polyether analyzed 964 g. per hydroxyl equivalent (phthalation method) and by UV analysis was found to contain 16.1 percent diene and 0.64 percent triene.

EXAMPLE 10

A slurry having the following composition was prepared by grinding in a ball mill overnight:

| | | |
|---|---|---|
| Distilled water | ml | 110 |
| Ethoxylated linseed alcohol (16 mols. EtO per mol.), product of Example 4 | g | 11 |
| Ethylene glycol | g | 4.5 |
| Antifoam | g | 0.01 |
| Hydroxyethyl cellulose | g | 1.1 |
| Ammonium dipicolinate | g | 0.1 |
| Titanium dioxide | g | 83.5 |
| Aluminum silicate, 4.8 mμ av. particle size | g | 10.2 |
| Mica, 325 mesh, comprising 58.38% SiO₂; 29.63% Al₂O₃; 6.91% K₂O; 1.08% CaO; 0.50% TiO₂ | g | 10.2 |
| ZnO | g | 44.5 |

The following oil phase was prepared and then blended into the above slurry to form an oil-in-water emulsion having a pH of 7.8:

| | G. |
|---|---|
| Linseed oil | 81.0 |
| Cobalt naphthenate (6% cobalt) | 1.1 |
| Sorbitol monoester of linseed fatty acids, product of Example 2 | 9.0 |

In accelerated (oven) stability tests at 120° F. the above paint emulsion was stable at 12 weeks. At room temperature the emulsion has been stable for over a year. Applied as films to wood panels and tested after drying overnight by the "water" test described in copending application S.N. 49,803 of Schwab et al., now Patent No. 3,047,413, in which test a fixed amount of water is allowed to fall at a fixed distance and rate upon a test surface, the paint was undamaged.

EXAMPLE 11

A slurry having the following composition was prepared by grinding in ball mill overnight:

| | | |
|---|---|---|
| Distilled water | ml | 220 |
| Polyoxyethylene (16 mols. EtO) adduct of cyclized sorbitol ester of linseed fatty acid, product of Example 2 | g | 22.0 |
| Ethylene glycol | g | 4.0 |
| Antifoam | ml | 0.2 |
| Hydroxyethyl cellulose | g | 2.2 |
| Ammonium dipicolinate | g | 0.2 |
| Titanium dioxide | g | 167.0 |

Aluminum silicate having an av. particle size of
 4.8 mμ _____ g__ 20.4
Mica, 325 mesh, comprising 58.38% SiO$_2$; 29.63%
 Al$_2$O$_3$; 6.91% K$_2$O; 1.08% CaO; 0.50%
 TiO$_2$ _____ g__ 20.4
Zinc oxide _____ g__ 88.8

The following oil phase was prepared and then blended with the above slurry to give an oil-in-water emulsion having a pH of 8.3:

Linseed oil _____ g__ 162.0
Cyclized sorbitol monoesters of linseed fatty acids,
 product of Example 3 _____ g__ 18.0
Cobalt naphthenate (6% cobalt) _____ ml__ 2.2

Accelerated oven tests at 120° F. showed the above emulsion paint as still stable at 12 weeks and a corresponding sample at room temperature is still stable at over one year.

EXAMPLE 12

A slurry having the following composition was prepared by grinding overnight in a ball mill:

Distilled water _____ ml__ 300
Polyoxyethylene ether (16 mols. EtO) of linseed
 alcohol, product of Example 9 _____ g__ 30
Ethylene glycol _____ g__ 12.3
Antifoam _____ g__ 0.3
Hydroxyethyl cellulose, WP4400 _____ g__ 2.9
Titanium dioxide _____ g__ 228
Aluminum silicate having an average particle size of
 4.8 mμ _____ g__ 27.8
Mica, 325 mesh, comprising 58.2% SiO$_2$; 29.63%
 Al$_2$O$_3$; 6.91% K$_2$O; 1.08% CaO; 0.50%
 TiO$_2$ _____ g__ 27.8
Zinc oxide _____ g__ 122
Ammonium dipicolinate _____ g__ 0.6

The following oil phase was prepared and then blended with the above slurry to form an oil-in-water emulsion:

G.
Linseed oil _____ 221
Cobalt naphthenate (6% cobalt) _____ 2.9
Sorbitol esters of linseed fatty acids _____ 24.5

The above emulsion has been stable at room temperature for over a year.

EXAMPLE 13

A stable linseed oil emulsion which could be used as a varnish upon the addition of tung oil and ester gum resins was prepared by blending the following separately prepared solution:

Solution A:
  Hydroxyethyl cellulose WP4400 _____ g__ 3
  Distilled water _____ ml__ 144
  Polyoxyethylene (16 mols. EtO) ether of linseed
    alcohol _____ g__ 3.3
  Ammonium dipicolinate _____ g__ 0.3
  Antifoam _____ g__ 0.3
  Ethylene glycol _____ g__ 5.0

Solution B:
  Linseed oil _____ g__ 310
  Cyclized sorbitol mono-ester of linseed fatty
    acids _____ g__ 31
  Cobalt naphthenate (6% cobalt) _____ g__ 4

The above emulsion has so far been stable at room temperature for three months.

Various modifications may be made in the specific teachings of the examples to provide additional drying oil emulsion compositions falling within the scope of the present invention. Thus, other soluble salts of dipicolinic acid such as the alkali metal salts may be substituted. The weight ratio of the dipicolinic acid or its salt to cobalt metal contained in the drier composition should be within the range of about 0.5 to about 6 and preferably within the range of about 1.0 to about 2.0. It is further contemplated that dipicolinic acid or salts thereof would serve also in conventional drying oil-based paints or varnish compositions to reduce the requirement for conventional metallic driers and especially of cobalt and in coating compositions containing conventional emulsifiers. The film-forming compositions of the present invention may also, if desired, include such other conventional pigments as calcium sulfate, carbon black, red iron oxide, etc. In substitution for the linseed oil any of the other drying or semi-drying vegetable oils such as dehydrated castor oil, soybean oil, china-wood oil, oiticica oil, safflower oil, perilla oil, cashew nut oil, etc., either raw, blown, heat-bodied, or otherwise conventionally modified may be used. Also, conventional emulsifiers including those having "built in" driers may be used in conjunction with the herein employed linseed-derived emulsifiers and dipicolinate.

Having fully disclosed my invention, I claim:

1. A coating composition comprising a stable emulsion of a drying oil in water, said emulsion also comprising up to 0.08 percent (based on the oil) of cobalt as the naphthenate, as a stabilizer for the cobalt between 0.1 percent and 0.5 percent (based on the oil) of the ammonium salt of dipicolinic acid dissolved in ethylene glycol, a hydrophobic linseed oil derived emulsifier, a hydrophilic ethenoxylated linseed oil-derived emulsifier, zinc oxide, and titanium dioxide.

2. A coating composition comprising a stable emulsion of a drying oil in water, said emulsion also comprising up to 0.08 percent (based on the oil) of cobalt as the naphthenate, as a stabilizer for the cobalt between 0.1 percent and 0.5 percent (based on the oil) of the ammonium salt of dipicolinic acid as a 5 percent solution in ethylene glycol, a hydrophobic emulsifier selected from the group consisting of the mono-, di-, and tri-sorbitol esters of linseed oil derived fatty acids, the corresponding mono-, di-, and tri-cyclized sorbitol esters of the linseed oil derived fatty acids, and the linseed monoglycerides, a hydrophilic emulsifier selected from the group consisting of polyoxyethylene adducts of sorbitol esters of linseed oil derived mixed fatty acids, polyoxyethylene adducts of cyclized sorbitol esters of the linseed oil derived mixed fatty acids, and polyoxyethylene ethers of the mixed linseed alcohols, zinc oxide, and titanium dioxide.

3. The composition of claim 2 wherein the ammonium salt of dipicolinic acid is present to the extent of 0.1–0.2 percent, based on the content of the drying oil.

4. The composition of claim 3, wherein the drying oil is linseed oil.

5. A method of substantially reducing the amount of metallic driers in a stable oil-in-water emulsion coating composition comprising a drying oil, said method comprising the step of adding a 5 percent solution of the ammonium salt of dipicolinic acid in ethylene glycol thereto.

6. The method of claim 5 wherein the coating composition is a stable aqueous emulsion of a vegetable drying oil in water.

7. The method of claim 6 wherein the vegetable drying oil is linseed oil.

8. The method of claim 7 wherein the metallic drier is cobalt naphthenate.

9. The method of claim 8 wherein the ammonium salt of dipicolinic acid is present in a concentration of 0.1–0.2 percent based on the content of the oil.

10. A stable oil-in-water emulsion comprising, as the disperse phase, a drying oil, about 1 part per 9 parts of said drying oil of a fugitive hydrophobic emulsifier selected from the group consisting of the mono-, di-, and tri-sorbitol esters of linseed oil derived fatty acids, the corresponding mono-, di-, and tri-cyclized sorbitol esters of the linseed oil derived fatty acids, and the linseed monoglycerides, about 1 part per 10 parts of water of a hydrophilic fugitive emulsifier selected from the group consisting of polyoxyethylene adducts of sorbitol esters of linseed oil derived mixed fatty acids, polyoxyethylene adducts of cyclized sorbitol esters of linseed oil derived mixed fatty acids, and the polyoxyethylene ethers of the mixed linseed alcohols, a cobalt naphthenate drier, zinc oxide, aluminum silicate, mica, and between 0.1 and 0.5%, based on the oil, of the ammonium salt of dipicolinic acid, said salt being in the form of a 5% solution in ethylene glycol.

References Cited in the file of this patent

UNITED STATES PATENTS

| | | |
|---|---|---|
| 2,403,408 | Stamberger | July 2, 1946 |
| 2,539,491 | Smith | Jan. 30, 1951 |
| 2,679,530 | Porret | May 25, 1954 |
| 2,852,405 | Myers et al. | Sept. 16, 1958 |
| 2,865,954 | Dehm | Dec. 23, 1958 |

UNITED STATES PATENT OFFICE
CERTIFICATE OF CORRECTION

Patent No. 3,140,191                      July 7, 1964

William L. Kubie

It is hereby certified that error appears in the above numbered patent requiring correction and that the said Letters Patent should read as corrected below.

Column 4, line 11, for "showed no absorption at 9.6μ characteristic" read -- , it had an acid value of 0.14, an iodine value --.

Signed and sealed this 17th day of November 1964.

(SEAL)
Attest:

ERNEST W. SWIDER
Attesting Officer

EDWARD J. BRENNER
Commissioner of Patents